United States Patent [19]
Von Wimmersperg

[11] 4,067,608
[45] Jan. 10, 1978

[54] CHILD SAFETY RESTRAINT

[76] Inventor: Heinrich F. Von Wimmersperg, 15929 Grand River Ave., Detroit, Mich. 48227

[21] Appl. No.: 635,653

[22] Filed: Nov. 26, 1975

[51] Int. Cl.² .............................................. A62B 35/00
[52] U.S. Cl. ................................... 297/216; 297/384; 297/390
[58] Field of Search ................ 297/250, DIG. 4, 384, 297/390, 216; 108/125; 280/744, 745, 748

[56] References Cited

U.S. PATENT DOCUMENTS

| | | | |
|---|---|---|---|
| 290,344 | 12/1883 | Morris | 297/250 X |
| 1,979,568 | 11/1934 | O'Connor et al. | 108/125 |
| 3,404,917 | 10/1968 | Smith | 297/250 |
| 3,596,986 | 8/1971 | Ragsdale | 297/250 |
| 3,635,526 | 1/1972 | Posey | 297/DIG. 4 |
| 3,934,934 | 1/1976 | Farrell, Jr. et al. | 297/250 X |
| 3,948,556 | 4/1976 | Hyde | 297/250 |

FOREIGN PATENT DOCUMENTS

| | | | |
|---|---|---|---|
| 1,966,727 | 10/1973 | Germany | 297/216 |

*Primary Examiner*—James T. McCall
*Attorney, Agent, or Firm*—Barnes, Kisselle, Raisch & Choate

[57] ABSTRACT

A child restraining device adapted to be secured on a vehicle seat and having a pair of legs adapted to engage the floor structure of the vehicle. The legs, in combination with a conventional seat belt, are designed to retain the device in a stable position on the vehicle seat with the child disposed in an inclined supine position facing either forwardly or rearwardly. The device includes a shield located in front of the child. The arrangement is designed to reduce the probability of serious head or other injury to a child in the event of a collision.

21 Claims, 25 Drawing Figures

U.S. Patent  Jan. 10, 1978  Sheet 1 of 4  4,067,608
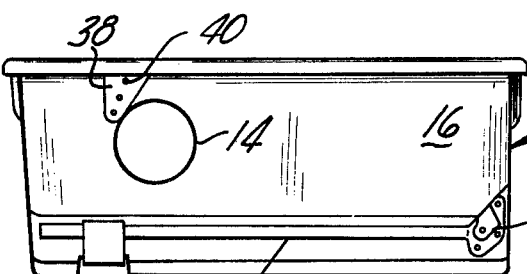
FIG-1
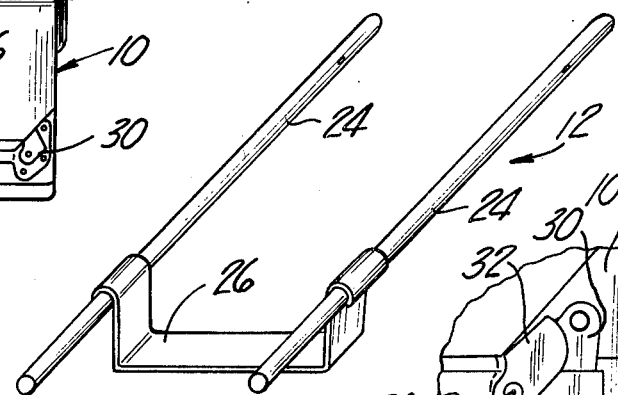
FIG-2
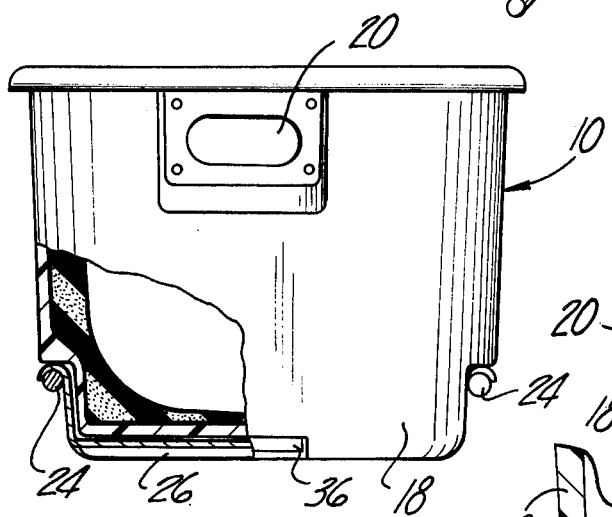
FIG-4
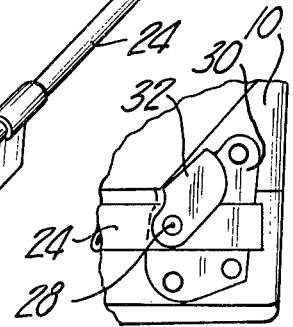
FIG-3
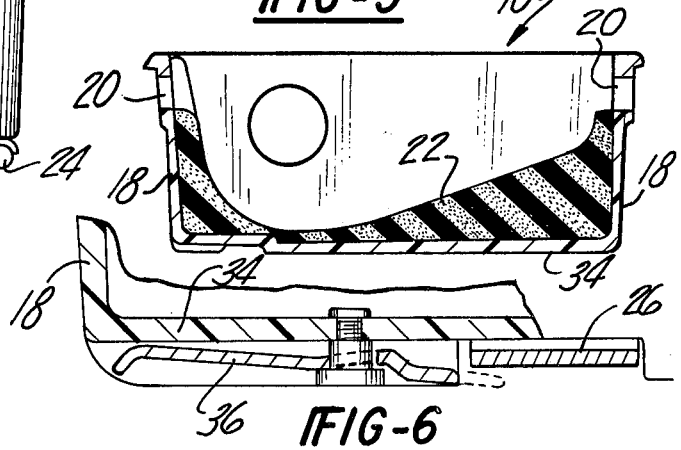
FIG-5
FIG-6
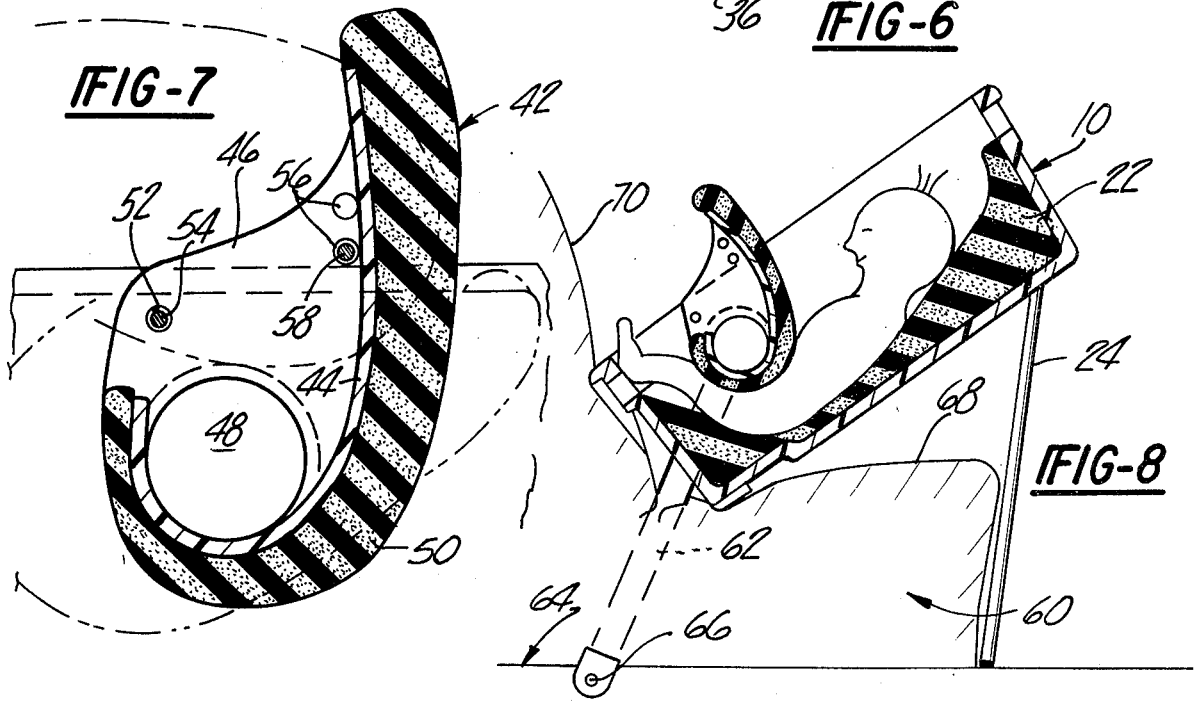
FIG-7
FIG-8

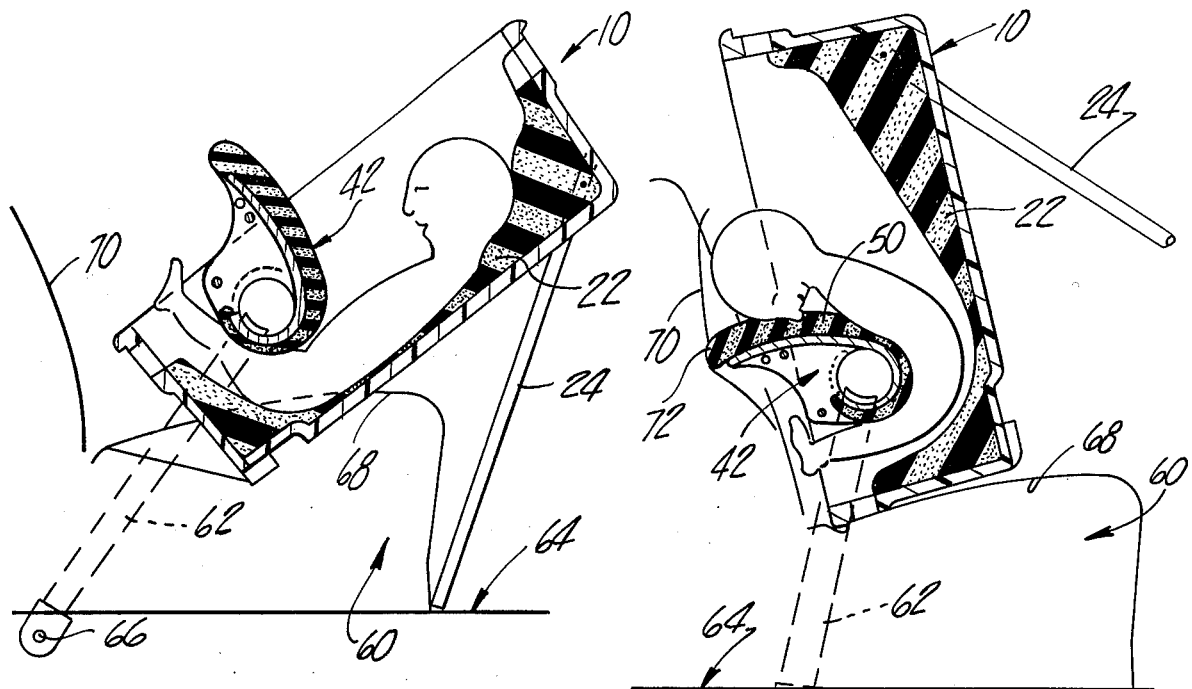
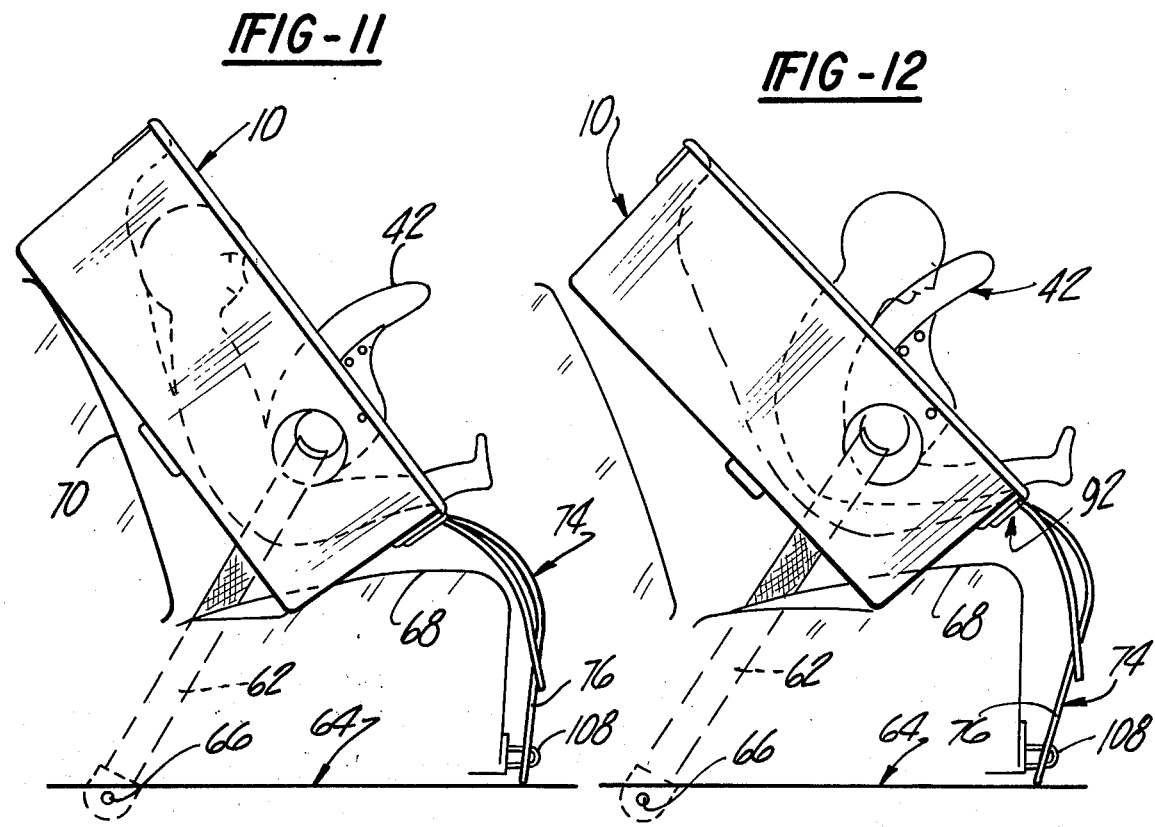

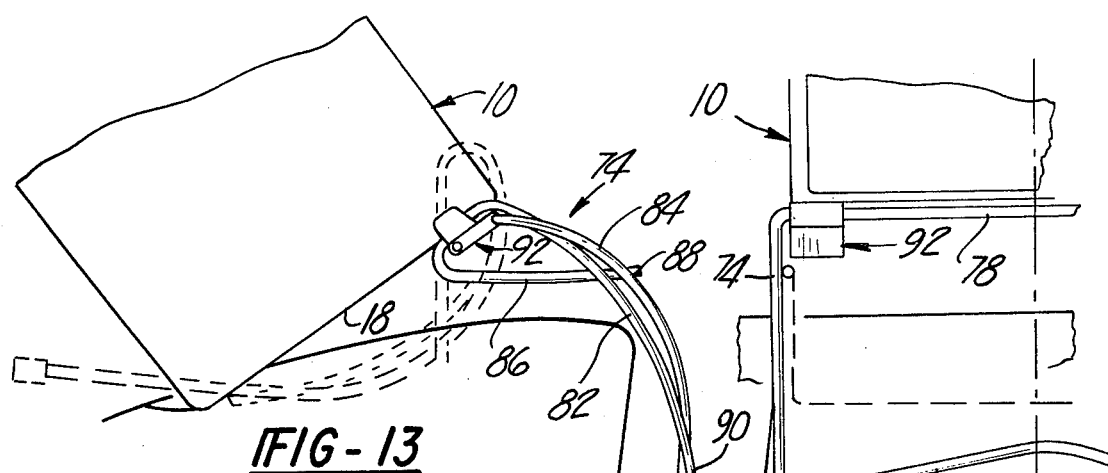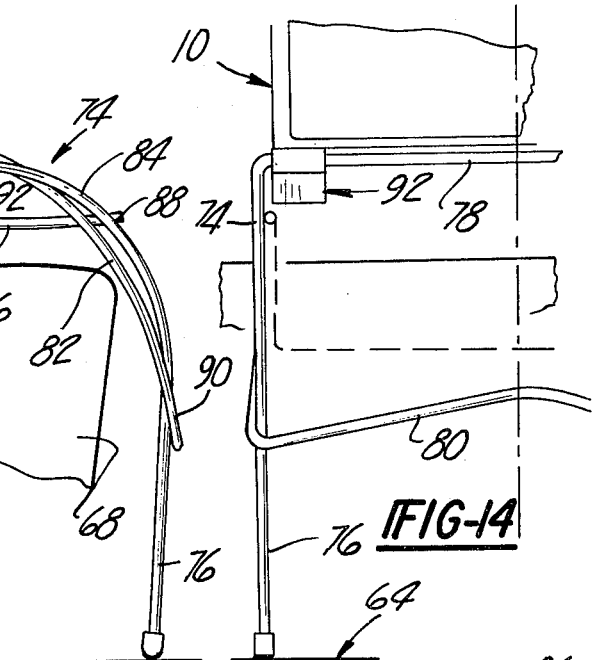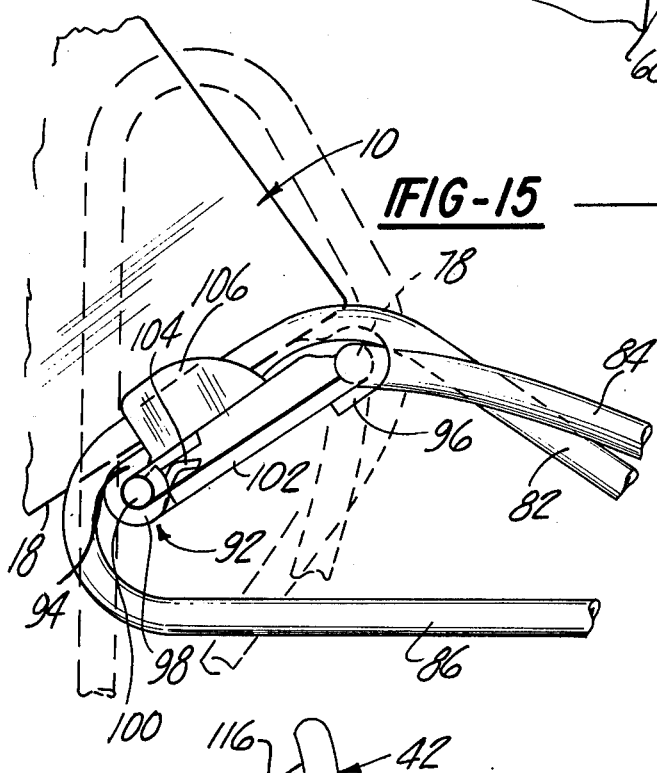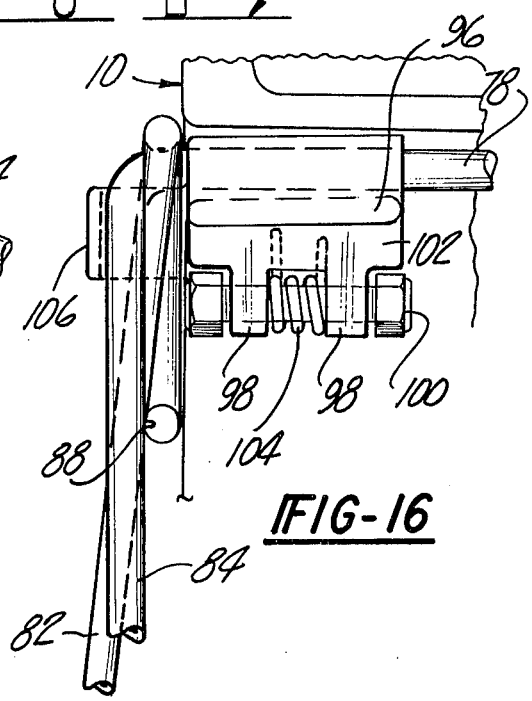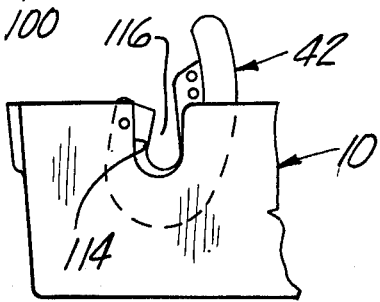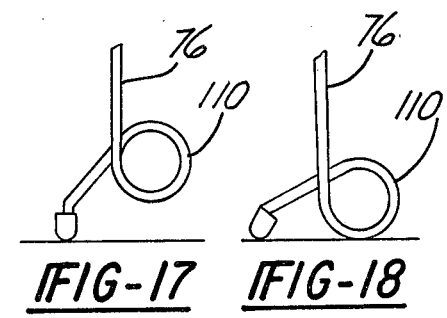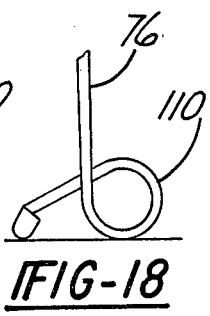

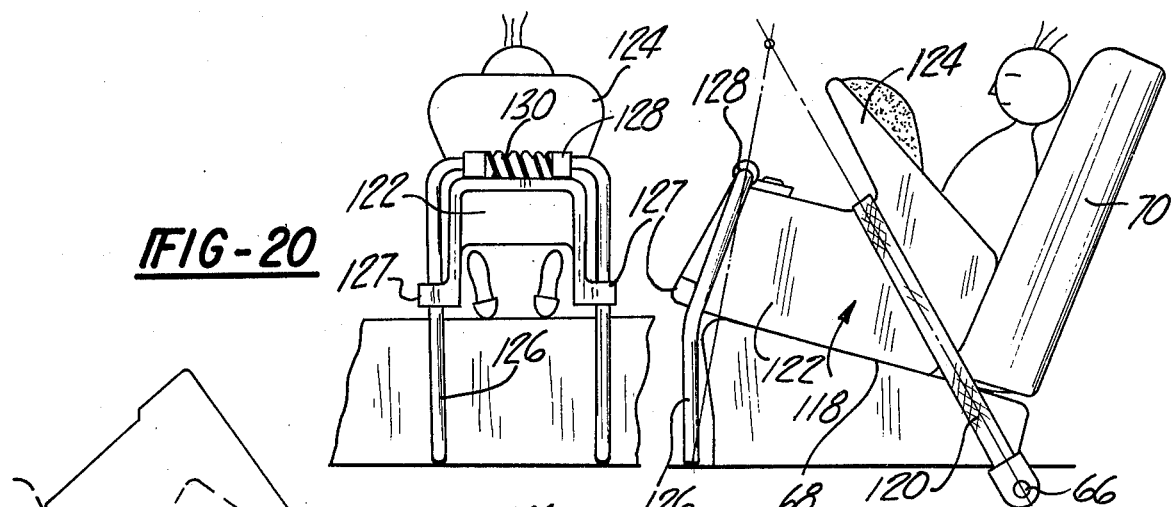
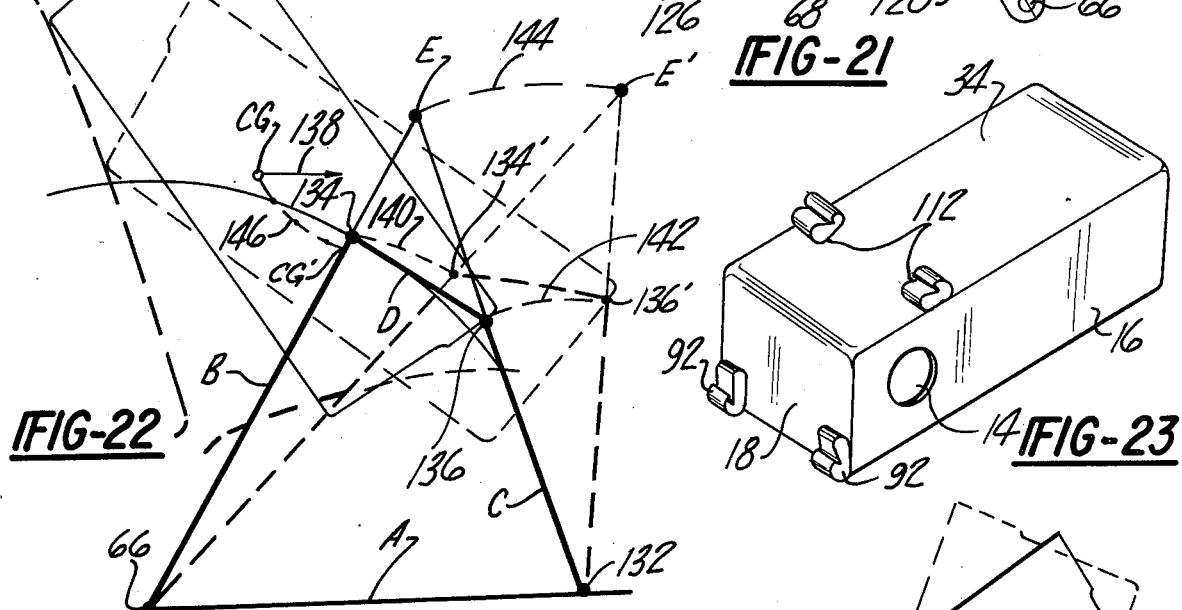
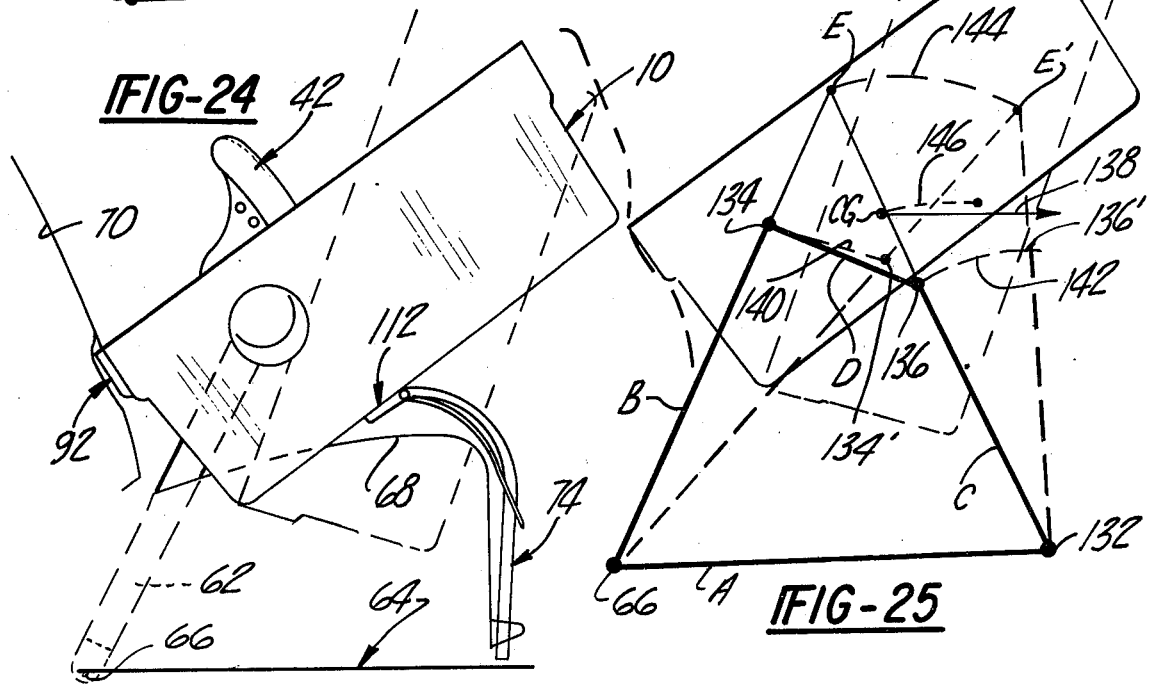

CHILD SAFETY RESTRAINT

This invention relates to a child restraining device for use in vehicles and more particularly to a device adapted to be secured on a vehicle seat in a manner to prevent injury to a child retained therein in the event of sudden deceleration or collision.

Child restraining devices resting on the seat cushion of a vehicle seat and held in a position by a strap such as a conventional lap safety belt normally swing forwardly and downwardly in a front end collision. The compression forces of the vehicle seat cushion are not sufficient to counteract the high rotational forces caused by the inertia of the restraining device and the child therein. The resulting violent rotation produces a substantial forward excursion of a child's head in a forward facing restraining device which results in severe impact or contact of the child's head with the vehicle dashboard or with the rear of the back rest of the front seat of the vehicle depending on whether the restraining device is mounted on the front or rear seat. If the restraining device faces rearwardly instead of forwardly the child can even be ejected from the device.

In an effort to prevent such violent rotation of the restraining device additional tether straps are frequently used. They are arranged in a manner to secure the upper end of the restraining device to the vehicle structure. However, because of the additional hardware required by such tether straps and the time and difficulty involved in attaching them, such tether straps are not frequently used.

Sometimes a child is placed horizontally in an infant bed or basket resting on a vehicle seat and the legs at the forward overhanging end thereof engage the floor structure of the vehicle. In such an arrangement the child is normally restrained by the walls of the car bed or basket. In the event of a crash with such an arrangement the child's body is impacted against a wall of the infant bed and the support legs at the forward end thereof have little effect in preventing injury to the child.

The present invention contemplates a restraining device wherein the child is arranged reclining in a supine position. The device may be arranged either facing forwardly or rearwardly with the child's spine in an inclined position. The device includes a pair of support legs adapted to engage the floor structure of the vehicle and also a shield or the like protecting the child within the device. The device of the present invention enables conversion of an infant bed as shown in my prior U.S. Pat. No. 3,833,946 into a rearwardly or forwardly facing child restraining device when the child outgrows the infant bed in the manner disclosed in my said prior patent. Thus the restraining device of the present invention enables the infant bed disclosed in said patent to be used as a child restraint until the child is about one and one half or two years old.

Accordingly, the primary object of the invention resides in the provision of a child restraining device adapted to be mounted on a vehicle seat and designed to minimize the probability of serious injury to a child in the event of a collision.

More specifically it is an object of the invention to provide a child restraining device which is so arranged as to prevent violent forward rotation of the device and child in the event of a front end collision.

A further object of the invention is to prevent the head of a child positioned in a rearwardly facing restraining device from being impacted against the back rest of the vehicle seat in the event of a rear end collision.

Another object of the invention is to provide a supporting leg structure for a vehicle infant bed of the type disclosed in my U.S. Pat. No. 3,833,946 to convert the latter selectively into a rearwardly or forwardly facing child restraint.

Other objects and advantages of the present invention will become apparent from the following description and drawings in which:

FIG. 1 is a side elevational view of a child restraining device of the present invention with the leg structure in the collapsed or retracted position.

FIG. 2 is a perspective view of one form of leg structure for the device.

FIG. 3 is a fragmentary view on an enlarged scale illustrating the manner in which the leg structure is connected to the body of the restraining device.

FIG. 4 is an end view partly in section of the restraining device.

FIG. 5 is a longitudinal sectional view of the device.

FIG. 6 is a fragmentary sectional view showing a latch for locking the leg structure in the collapsed position.

FIG. 7 is a fragmentary sectional view showing the shield arrangement of the device.

FIG. 8 shows the child restraint arranged on a vehicle seat in a rearwardly facing direction.

FIG. 9 shows the position assumed by the child restraint illustrated in FIG. 8 in the event of a front end collision.

FIG. 10 is a view similar to FIG. 9 showing the action of the restraint on a child in the event of a rear end collision.

FIG. 11 shows the device with a modified leg structure mounted on a vehicle seat in a forwardly facing direction.

FIG. 12 shows the position assumed by the device illustrated in FIG. 11 in the event of a front end collision.

FIG. 13 is a fragmentary side elevational view on an enlarged scale illustrating the leg structure of the device shown in FIGS. 11 and 12.

FIG. 14 is a fragmentary front elevational view of the leg structure.

FIGS. 15 and 16 are fragmentary side and front elevational views on an enlarged scale of the leg structure shown in FIGS. 13 and 14.

FIGS. 17 and 18 illustrate a deformable leg support before and after a collision.

FIG. 19 is a fragmentary side elevational view showing a modified form of child restraining device in accordance with the present invention for use with a vehicle seat belt which includes a shoulder strap.

FIGS. 20 and 21 are front and side elevational views, respectively of a further modification of the invention wherein the body of the restraint is a shell member of the type illustrated in my U.S. Pat. No. 3,232,665 with the leg structure of the present invention.

FIG. 22 is a diagramatic view illustrating the kinematic characteristics of the child restraint device of this invention when arranged in the manner illustrated in FIG. 11 and subjected to front end collision.

FIG. 23 is a somewhat schematic perspective view illustrating the use of two pair of leg mounting attachments on the device.

FIG. 24 is a side elevational view showing the device of FIG. 23 arranged on a vehicle seat in a rearwardly facing direction with the leg structure attached to the bottom of the device.

FIG. 25 is a diagramatic view illustrating the kinematic characteristics of the device as arranged in FIG. 24 in the event of a front end collision.

In the embodiment of the invention illustrated in FIGS. 1 through 8 the device comprises a shell 10 on which is mounted a leg structure 12. Shell 10 is preferably formed of a shape retaining plastic material and defines a generally rectangular enclosure for the child. The shell is formed with an opening 14 on each side wall 16 thereof adjacent one end of the shell. Desirably the shell consists of an infant bed of the type illustrated in my U.S. Pat. No. 3,833,946, in which case each end wall 18 is provided with an opening 20 therethrough to accommodate the attachment of a conventional seat belt to the shell as illustrated and described in U.S. Pat. No. 3,833,946. The interior of shell 10 is preferably lined with an energy absorbing cushion 22 formed of a material such as foam plastic having low elastic memory. Cushion 22 is preferably contoured to receive the child in a supine position with its head adjacent the end of the shell remote from openings 14.

The leg structure 12 comprises a pair of legs 24 connected adjacent one end in parallel spaced apart relation by a generally U-shaped bracket 26. The other ends of legs 24 are pivotally connected as at 28 to metal brackets 30 riveted one to each side wall of shell 10. In the arrangement illustrated in FIGS. 1-8 brackts 30 are mounted on shell 10 adjacent the head end thereof remote from openings 14. Each bracket includes a flange 32 which serves as a stop for limiting rotation of legs 24 in a counterclockwise direction as viewed in FIG. 3. Flange 32 limits pivotal movement of legs 24 to the position generally illustrated in FIGS. 9 and 10. On the bottom wall 34 of shell 10 there is a slidably mounted leaf spring latch 36 which, when shifted in a direction toward brackets 30 is adapted to engage beneath bracket 26 and retain leg structure 12 in the collapsed or retracted position illustrated in FIGS. 1 and 4.

On each side wall 16 of shell 10, at a position located slightly forwardly and above openings 14, there is mounted a reinforcement 38 having a plurality of vertically spaced apertures 40 therethrough (FIG. 1). A shield 42 is adapted to be adjustably mounted on shell 10 by means of apertures 40. Shield 42 comprises a rigid generally J-shaped frame 44 having a pair of spaced apart end walls 46. Shield 46 has a width corresponding to the interior of shell 10. The two end walls 46 of shield 42 are provided with large openings 48 therein. Frame 44 is heavily padded with an energy absorbing material 50 preferably of the type having low elastic memory. End walls 46 of shield 42 have axially aligned openings 52 adapted to register with one of the openings 40 on shell 10. A rod 54 is adapted to be inserted through openings 52 and the registering pair of openings 40 to pivotally support the shield on the shell. Each side wall 46 of shield 42 is also formed with two or more vertically spaced openings 56 through either of which a rod 58 may be inserted with the ends thereof resting upon the upper edges of side walls 16 of shell 10. The plurality of openings 40 in shell 10 and openings 56 in shield 42 enable the shield to be mounted in various positions on shell 10 in accordance with the size of the child to be retained in the device. Openings 48 in shield 42 and openings 14 in side walls 16 are sufficiently large so they at least partially register regardless of which set of apertures are employed for mounting the shield on the shell.

The device illustrated in FIGS. 1 through 7 is specifically designed to be positioned on a vehicle seat 60 in a rearwardly facing direction as shown in FIG. 8. Legs 24 are dimensioned to retain shell 10 in a rearwardly facing inclined position so that the child's spine is inclined to the horizontal at an angle of between about 30° and 75°. A conventional lap seat belt, the ends of which are anchored to the floor structure 64 of the vehicle as at 66, is threaded through the aligned openings 14, 48 and tightened so that the lower rear corner of the shell is compressed into the seat cushion 68 and the upper rear edge of the shell is compressed into the back rest 70.

As will be described more fully hereinafter, in the event of a front end collision, seat belt 62 stretches slightly and permits the shell 10 to shift slightly forwardly. However pivotal movement of legs 24 are arrested when they reach the position shown in FIG. 9 so that the upper forward end of the shell is prevented from rotating downwardly to any substantial extent. Thus the child's entire body, especially its head and shoulders, is merely pressed more deeply into and against the shock absorbing cushion 22 and is prevented from being ejected in a direction upwardly and forwardly of the vehicle by the restraining action of the lower portion of shield 42. In the event of a rear end collision or in the case of a rebound from a front end collision, shell 10 is rotated upwardly and counterclockwise as shown in FIG. 10. It will be observed that shield 42 is designed such that the upper end thereof generally designated 72 in its adjusted position projects upwardly substantially beyond the upper edges of side walls 16 of shell 10. Thus when shell 10 rotates upwardly and rearwardly, the upper end 72 of the shield contacts and presses into the back rest 70 and prevents impact of the child's head with the back rest. The child's torso may in a sense wrap around the J-shaped shield 42 but no severe injury to the child will result therefrom because the padding 50 on the shield is a compressible material having a low elastic memory. If a rear end collision results in a rebound, then the shell will thereafter be rotated forwardly generally to the position shown in FIG. 9 wherein the impact forces are absorbed by cushion 22. In either event the relationship between the child's head, neck and spine are not appreciably altered so that severe injury to the head is avoided and no danger of breaking the child's neck is encountered.

A second embodiment of the invention is illustrated in FIGS. 11 through 16. In this arrangement shell 10 and shield 42 are substantially the same as previously described. The modification of this embodiment is concerned primarily with the leg structure 74. This leg structure consists of a pair of spaced parallel legs 76 integrally connected at their upper ends by a cross rod 78 so as to present an inverted U-shaped leg structure. Each leg 76 is reinforced by a second U-shaped member consisting of a central bight portion 80 and a pair of side loop members 82. In the normal position of the device the upper ends of legs 76 are curved rearwardly as at 84 where they connect with the cross rod 78. Likewise the loop members 82 curve upwardly and rearwardly around cross rod 78 and then forwardly as at 86. The loop members 82 are welded to legs 76 as at 88 and 90.

As shown in FIGS. 12 through 16 leg structure 74 is pivotally connected to the front end wall 18 of shell 10 adjacent the upper edge thereof by a pair of brackets 92. Each bracket has a flat base plate 94 by means of which it is secured to the end wall 18. At its upper end each bracket 92 is formed with a circular return bent portion 96 and at its lower end each bracket is formed with a pair of aperture-forming ears 98 for receiving a pintle 100. A latch plate 102 is pivotally supported on pintle 100. Latch plate 102 is dimensioned so that its free end underlies the end of the return bent portion 96 and is biased in a clockwise direction as viewed in FIG. 16 by a coil spring 104. With this arrangement the cross rod portion 78 of legs 76 can be snapped into the return bent portion 96 and will be retained therein by the free end of latch plate 102 (FIG. 15). When it is desired to remove the leg structure from the shell, latch plate 102 is depressed against the bias of spring 104 so that the free end thereof clears the cross rod 78 and permits the cross rod to be released from the latch. Lateral displacement of leg structure 74 is prevented by ears formed integrally with one or each base plate 94. Ear 94 also prevents pivotal movement of leg structure 74 in a counterclockwise direction from the position illustrated in FIG. 15.

With the form of child restraint illustrated in FIGS. 11–16, shell 10 is designed to be positioned on the vehicle seat in an inclined forwardly facing position as illustrated in FIG. 11. If desired the lower ends of legs 76 may be prevented from moving forwardly by connecting them to the vehicle seat or the floor structure by any suitable means such as the hooks 108. When the seat belt 62 is tightened, the shell is pulled downwardly and rearwardly against the seat cushion 68 and back rest 70 as illustrated in FIG. 11.

In the event of a front end collision, shell 10 with the child therein is displaced slightly forwardly and downwardly into seat cushion 68 since the seat belt 62 is capable of stretching at least a slight amount. Although the impact may cause the child's body to assume the configuration shown in FIG. 12, the shape and construction of shield 42 and the fact that it extends directly over the lap and in front of the child's head and chest prevents any serious injury to the child. It will be observed that leg structure 74 is prevented from being displaced forwardly and shell 10, although displaced forwardly to a slight extent, actually rotates in a counterclockwise direction as viewed in FIG. 12, thus resulting in a minimum forward excursion of the child's head and reducing the likelihood of a whiplash injury. At the same time the frictional forces of the shell against the seat cushion 68, which is further compressed, provide a smooth deceleration to the shell and child and reduce the force of rebound.

In order to further smoothly decelerate and reduce the impact force of the head on the shield, the legs themselves may be designed to deform slightly under load. As shown in FIG. 17, legs 76 may be formed of a non-resilient, yieldable material with the lower ends shaped into loops 110. Loops 110 are designed such that when the inertia forces of the shell and child reach a predetermined high value they will deform and thereby provide further controlled deceleration. After the loop formations 110 have deformed to the configuration illustrated in FIG. 18 the legs 76 again become rigid and resist further downward movement of the forward end of the shell.

If it is desired to support the shell on the seat in a rearwardly facing direction by means of the same short leg structure 74, this can be accomplished by mounting a second set of brackets or equivalent means on the bottom wall of the shell as shown schematically at 112 in FIGS. 12 and 24. This enables the same shell and leg structure to be employed with either a forwardly or rearwardly facing child restraint. It will be appreciated that if the leg structure 74 is removed the shell can be used as a conventional infant bed or as a vehicle safety infant bed in the manner illustrated in my U.S. Pat. No. 3,833,946.

In vehicles where a three-point lap-shoulder seat belt is provided and it is either impractical or difficult to thread the lap belt through the shell and shield, the side walls of the shell can be notched as at 114 as shown in FIG. 19. Shield 42 can likewise be provided with a similar U-shaped notch 116 to accommodate the lap belt.

In FIGS. 20 and 21 I have illustrated the manner in which the child restraint device illustrated in my U.S. Pat. No. 3,232,665 can be modified in accordance with the present invention. The child restraint consists of a shell 118 adapted to be positioned on a vehicle seat and retained thereon by a seat belt 120. Shell 118 consists of a horizontally extending tunnel portion 122 and an upwardly and forwardly inclined head and chest protecting shield 124. In this arrangement the child is positioned on the vehicle seat and shell 118 placed thereover so that the legs of the child extend through the tunnel portion 122 and shield 124 is disposed slightly forwardly of the head and chest of the child. In order to prevent shell 118 from rotating downwardly and forwardly in the event of a front end collision a leg structure 126 is pivotally connected to the shell as at 128. A torsion spring 130 urges leg structure 126 in a counterclockwise direction as viewed in FIG. 21 and a stop 127 limits forward rotation of the leg structure to the position shown. Leg structure 126 and seat belt 120 are arranged so that, in the event of a front end collision, they cooperate to prevent shell 118 from rotating forwardly and downwardly. The padded shield 124 prevents excessive forward excursion of the child's head and also eliminates the possibility of severe injury to the head, neck and chest of the child.

In each of the embodiments illustrated it will be observed that the legs are disposed one at each side of the shell. In the event of a sidewise collision the spaced apart legs impart lateral stability to the device and prevent excessive rotation thereof in a plane perpendicular to the seat cushion. This arrangement will likewise prevent excessive lateral excursion of the child and tend to minimize injury.

In each of the embodiments illustrated it will be observed that during a front end collision the restraining device in combination with the vehicle acts in the manner of a four-element linkage. One of the elements of this linkage is floor structure of the vehicle. Another element is the seat belt. The third element is the leg structure and the fourth element is the shape retaining shell. In each of the embodiments illustrated the stretchable seat belt 62 extends upwardly and forwardly from its anchoring points 66. Likewise the leg structure is inclined to the line of the seat belt. The lower ends of the legs are prevented from moving forwardly and the upper ends are fixed in a position relative to the shell. Likewise the openings through the shell through which the seat belt extends are fixed relative to the shell.

Thus referring to FIGS. 22 and 25 the vehicle's floor structure between the anchoring point 66 and the points designated 132 where the leg contracts the floor structure defines one fixed element A of the four element linkage. A line drawn through the anchoring point 66 and the aperture 14 through which the seat belt extends, designated 134, defines a second element B of the linkage. The third element C of the linkage is defined by a straight line between the lower end of the leg, the point 132, and the pivotal connection 134 between the leg and the shell. The fourth element of the linkage is defined by a straight line D between the two fixed points 134, 136 on the shell. Of course it will be appreciated that this four element linkage exists on both sides of the device and both linkages operate in the same manner. In reality points 132, 134, 136 and 138 define horizontal pivot axes extending transversely of the vehicle.

In the normal at rest position the lines designated B and C intersect at point E. In the arrangements described and shown links A, B, C and D are arranged so that the intersecting point E lies above the center of gravity CG of the mass of the restraining device with the child in it. This is an important feature of the present invention. The importance of this feature in a front end collision is best appreciated from a study of the kinematics illustrated in FIGS. 22 and 25. FIG. 22 depicts the kinematics involved when the shell is arranged in a forwardly facing direction and FIG. 25 depicts the kinematics involved with a rearwardly facing shell. In a front end collision the inertia forces of the child and the restraining device, acting through the center of gravity CG, are directed forwardly along the path designated by arrow 138. Since the seat belt stretches slightly point 134 actually moves along a path corresponding to the curve 140 and this in turn causes point 136, the pivotal connection between the leg structure and the shell to move along the curve 142. Thus the point E of intersection between links B and C, which represents the momentary axis of rotation of the shell, moves in an arcuate path along curve 144 and the center of gravity CG moves along the arcuate path 146. The path of travel of point CG always remains below the path of travel of point E.

The above described action of links A, B, C and D cause shell 10 to rotate in a generally counterclockwise direction. This rotation is resisted primarily by the upward force exerted by the seat cushion on the lower corner of the shell and the friction resulting therefrom. This tends to produce a smooth deceleration and the shell eventually assumes the position shown in broken lines in FIGS. 22 and 25. As a result, point 134 moves to the position indicated 134'. Point 136 moves to the position designated 136' and point E moves around curve 144 to the position designated E'. At the same time the center of gravity moves along the path 146 to the position designated CG'.

Thus if the shell is arranged in a forwardly facing position as shown in FIG. 22, it rotates counterclockwise about the forwardly moving point E as an axis such that the upper end swings downwardly and the lower end swings forwardly while exerting substantial downward compression on the seat cushion. When the shell faces rearwardly as shown in FIG. 25 the upper end is displaced in a rearward direction and the lower end is displaced in a forward direction while exerting substantial downward compression on the seat cushion. The relatively high compression forces exerted on the seat cushion together with the friction resulting therefrom produce the desired controlled deceleration and considerably dampen the rebound action. The ultimate result of this combined action is substantially the opposite of that which occurs in a front end collision with a conventional child restraint. The child's body is smoothly decelerated and severe impact of the child's body is smoothly decelerated and severe impact of the child's head with the vehicle structure effectively prevented. This is highly desirable especially in the case of relatively small cars where the danger of severe impact is considerably greater.

In addition to minimizing the child's head excursion, the arrangement of the present invention possesses further advantages. The weak, slanted, soft shoulders of an infant are not mechanically capable of restraining ejection of a infant from a safety device through the use of shoulder straps without severe injury to the infant even if the child does not slip through them. When the infant carrier of the present invention is arranged in a rearwardly facing direction, a front end collision rotates the device into a more horizontal position. The spine of the child is not bent into a position conductive to ejection of the child. As shown in FIG. 9 the head and torso are merely pressed deeply into the deep soft shock absorbing cushion 22 and retained in the carrier by shield 46.

Another advantage of the rear facing carrier in a frontal crash is that the mass of the child's head joins the mass of the vehicle at a very early stage of deceleration. Both the child and the vehicle decelerate at somewhat comparable rates. With conventional infant carriers, the carrier and the child's head continue to swing forwardly and downwardly after the vehicle stops and thus do not utilize to advantage the plastic deformation of the vehicle itself.

I claim:

1. In a vehicle of the type having a seat defined by a seat cushion and a backrest and also having a rigid floor structure, a child restraint device to protect the child in the event of an impact comprising a walled enclosure in which the child is adapted to be positioned in a supine position, said enclosure including a shape retaining shell, means on said enclosure for preventing the child therein from being thrown therefrom in the event of vehicle impact, said shell being disposed with a lower portion thereof supported on the seat cushion so that the spine of the child therein extends generally longitudinally of the vehicle and is inclined to the horizontal, a pair of support legs connected at their upper ends to the enclosure adjacent each side thereof and having a support position wherein they extend downwardly from the enclosure to engage the floor structure of the vehicle at their lower ends forwardly of the vehicle seat, restraining belt means anchored to the floor structure of the vehicle adjacent the rear of the vehicle seat and extending therefrom in an upward and forward direction and connected at its upper end with said enclosure rearwardly of the connection between said support legs and enclosure and means for preventing said legs from swinging in a direction forwardly and upwardly relative to the enclosure substantially beyond said support position, said restraining belt means when tightened cooperating with said legs to urge said enclosure downwardly against said seat cushion, said support legs and said belt restraining means being arranged relative to each other so that the plane extending through the connection points of the belt means with the vehicle floor structure and the enclosure and the plane extending through the lower ends of said legs and the connection between the legs and the enclosure are inclined towards each other and intersect at an axis which is disposed horizontally above the center of gravity of the enclosure with the child positioned therein whereby any tendency for the enclosure to tilt sidewise or for the upper end thereof to tilt downwardly and forwardly about the connection of the belt means and enclosure as a result of a collision is resisted by the joint effect of said legs and belt means.

2. The combination called for in claim 1 wherein the enclosure is disposed on the vehicle seat such that the spine of the child is disposed at an angle to the horizontal of between about 30° and 75°.

3. The combination called for in claim 2 wherein said legs are pivotally connected to the enclosure.

4. The combination called for in claim 1 wherein said legs are connected to a forwardly facing portion of the enclosure.

5. The combination called for in claim 3 wherein said means for preventing swinging movement of said legs comprise abutment means on said enclosure engageable with said legs for preventing pivotal movement of the legs in said forward direction.

6. The combination called for in claim 5 wherein said legs are pivotable from support said position in a rearward direction.

7. The combination called for in claim 3 including means pivotally biasing said legs in a rearward direction.

8. The combination called for in claim 3 wherein said means for preventing swinging movement of said legs comprise means on the vehicle engageable with the lower ends of the legs.

9. The combination called for in claim 1 wherein said enclosure has a bottom wall and an end wall and including means for optionally connecting the upper ends of said legs to said end wall for arranging the enclosure in a forwardly facing direction or with the bottom wall for arranging the enclosure in a rearwardly facing direction.

10. The combination called for in claim 2 wherein the legs are dimensioned to support the enclosure in a forwardly facing position inclined upward in a rearward direction.

11. The combination called for in claim 2 wherein the legs are dimensioned to support the enclosure in a rearwardly facing position inclined upward in a forward direction.

12. The combination called for in claim 1 wherein said legs are formed at least in part of a generally nonresilient material capable of plastic deformation when a force tending to collapse the legs exceeds a predetermined amount.

13. The combination called for in claim 10 wherein the enclosure is disposed in said forwardly facing inclined position with its lower forward end supported on the seat cushion, its upper rear end positioned against the back rest of the seat and the forward upper end supported by said legs.

14. The combination called for in claim 11 wherein the enclosure is positioned in said rearwardly facing inclined position with its lower rear end supported on the seat cushion and its forward upper end supported by said legs.

15. The combination called for in claim 14 wherein said child restraining means comprises a shield mounted on said enclosure in a position extending over the lap and in front of the head and chest of a child therein, said shield projecting at one end upwardly and outwardly of said enclosure and being dimensioned such that in the event of a front end collision wherein the enclosure tends to rotate upwardly and rearwardly, the projecting end of the shield will project rearwardly of the vehicle a greater extent than the head of a child in the enclosure whereby to prevent impact of the child's head with the back rest of the seat.

16. The combination called for in claim 1 wherein said child restraining means comprises a shield mounted on the enclosure in a position to extend over the lap and in front of the head and chest of a child within the enclosure.

17. The combination called for in claim 16 wherein said shield and in the interior of said enclosure are cushioned with an energy absorbing material having low elastic memory.

18. The combination called for in claim 16 wherein the shield is attached to the enclosure for ready removal therefrom.

19. The combination called for in claim 16 wherein the shield is attached to the enclosure by means which permit adjustment in the location of the shield on the enclosure to accommodate for children of different sizes.

20. The combination called for in claim 1 including means for releasably mounting the legs on said enclosure.

21. The combination called for in claim 1 including means on said enclosure located at a plurality of points spaced longitudinally of the enclosure, each adapted for releasably mounting the legs thereon.

* * * * *

UNITED STATES PATENT OFFICE
CERTIFICATE OF CORRECTION

PATENT NO. : 4,067,608
DATED : JANUARY 10, 1978
INVENTOR(S) : Heinrich F. vonWimmersperg It is certified that error appears in the above-identified patent and that said Letters Patent are hereby corrected as shown below:

Column 9, Line 23   Cancel "support said" and insert

-- said  support --

Signed and Sealed this

Eighteenth Day of April 1978

[SEAL]

Attest:

RUTH C. MASON
Attesting Officer

LUTRELLE F. PARKER
Acting Commissioner of Patents and Trademarks